US008375135B2

(12) United States Patent
Edge et al.

(10) Patent No.: US 8,375,135 B2
(45) Date of Patent: *Feb. 12, 2013

(54) METHOD FOR SECURE USER PLANE (SUPL) VERSION NEGOTIATION

(75) Inventors: Stephen W. Edge, Escondido, CA (US); Andreas K. Wachter, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,481

(22) Filed: Mar. 26, 2012

(65) Prior Publication Data

US 2012/0185602 A1 Jul. 19, 2012

Related U.S. Application Data

(63) Continuation of application No. 12/189,738, filed on Aug. 11, 2008, now Pat. No. 8,145,769.

(60) Provisional application No. 60/975,454, filed on Sep. 26, 2007.

(51) Int. Cl.
*G06F 15/16* (2006.01)

(52) U.S. Cl. ........................................ 709/228; 709/200

(58) Field of Classification Search .................. 709/228, 709/220
See application file for complete search history.

(56) References Cited

U.S. PATENT DOCUMENTS

| 6,754,717 | B1 * | 6/2004 | Day et al. ....................... 709/248 |
| 6,810,409 | B1 * | 10/2004 | Fry et al. ........................ 709/202 |
| 7,110,774 | B1 * | 9/2006 | Davis et al. .................. 455/456.1 |
| 7,308,237 | B2 | 12/2007 | Kokkonen et al. |
| 7,554,934 | B2 * | 6/2009 | Abraham et al. .............. 370/310 |
| 7,653,911 | B2 * | 1/2010 | Doshi et al. .................... 719/313 |
| 7,701,970 | B2 * | 4/2010 | Krits et al. ..................... 370/466 |
| 7,714,779 | B2 | 5/2010 | Abraham |
| 7,974,235 | B2 * | 7/2011 | Ghozati et al. ................ 370/328 |
| 8,145,769 | B2 | 3/2012 | Edge et al. |
| 2003/0159135 | A1 * | 8/2003 | Hiller et al. ................... 717/166 |
| 2004/0185865 | A1 | 9/2004 | Maanoja |
| 2005/0107094 | A1 | 5/2005 | Hulkkonen et al. |
| 2006/0063534 | A1 * | 3/2006 | Kokkonen et al. ......... 455/456.1 |
| 2006/0246919 | A1 * | 11/2006 | Park et al. .................. 455/456.1 |

(Continued)

FOREIGN PATENT DOCUMENTS

| CN | 1749874 A | 6/2006 |
| EP | 0279232 A2 | 8/1988 |

(Continued)

OTHER PUBLICATIONS

M. Thomson, J.Winterbottom, "Device Capability Negotiation for Device-Based Location Determination and Location Measurements in HELD", Jun. 28, 2006, pp. 1-24.*

(Continued)

*Primary Examiner* — John Follansbee
*Assistant Examiner* — Anthony Mejia
(74) *Attorney, Agent, or Firm* — Liberty E. Mann (57) ABSTRACT

The subject matter disclosed herein relates to a system and method for negotiating a version of Secure User Plane Location (SUPL) between a network entity and a SUPL enabled terminal. In a particular implementation, a SUPL initiation message is transmitted from a network entity to a SUPL entity, where the SUPL initiation message identifies a plurality of SUPL versions capable of supporting a desired service. A response is received from the SUPL entity that is based, at least in part, on an ability of the SUPL entity to support at least one of the plurality of versions.

40 Claims, 8 Drawing Sheets

U.S. PATENT DOCUMENTS

| | | | |
|---|---|---|---|
| 2007/0037585 A1 | 2/2007 | Shim | |
| 2007/0096981 A1* | 5/2007 | Abraham | 342/357.15 |
| 2007/0162228 A1* | 7/2007 | Mitchell | 701/213 |
| 2007/0162680 A1* | 7/2007 | Mitchell | 711/1 |
| 2008/0045237 A1* | 2/2008 | Yan | 455/456.1 |
| 2008/0109650 A1* | 5/2008 | Shim et al. | 713/151 |
| 2008/0126535 A1* | 5/2008 | Zhu et al. | 709/224 |
| 2008/0253391 A1* | 10/2008 | Krits et al. | 370/466 |
| 2009/0036142 A1* | 2/2009 | Yan | 455/456.1 |
| 2009/0063582 A1* | 3/2009 | Anna et al. | 707/203 |

FOREIGN PATENT DOCUMENTS

| | | |
|---|---|---|
| JP | 2004064446 A | 2/2004 |
| JP | 2008547263 A | 12/2008 |
| KR | 20070019434 A | 2/2007 |
| RU | 2255433 | 6/2005 |
| RU | 2296436 C2 | 3/2007 |
| WO | WO03005750 | 1/2003 |
| WO | WO03081939 A1 | 10/2003 |
| WO | WO2006075856 A1 | 7/2006 |

OTHER PUBLICATIONS

English Translation for Korean Application No. 10-2005-0074402.*

Andreas Wachter, Stephen Edge: "SUPL2_0_TS ULP SUPL version negotiation"[Online] Sep. 26, 2007, pp. 1-9, XP002509298 Retrieved from the Internet URL: http://member.openmobilealliance.org/ftp/Public_documents/LOC/2007/0MA-LOC-2007-0357-CR_SUPL2_0_TS_ULP_SUPL_version_negotiation.zip> [retrieved on Jan. 7, 2009] the whole document.

Dierks T Certicom Allen C Certicom: "The TLS Protocol Version 1.0; rfc2246.txt" IETF Standard, Internet Engineering Task Force, IETF, CH, Jan. 1, 1999, XP015008030 ISSN: 0000-0003.

International Search Report and Written Opinion—PCT/US2008/077980—ISA/EPO—Jan. 16, 2009.

M. Thomson, J. Winterbottom, "Device Capability Negotiation for Device-Based Location Determination and Location Measurements in HELD", Jun. 28, 2006, pp. 1-24.

Open Mobile Alliance: "Secure User Plane Architecture", OMA-AD SUPL-V1-0-20070615-A, Jun. 15, 2007, pp. 1-72.

Open Mobile Alliance: "UserPlane Location Protocol" [Online] Sep. 5, 2007, pp. 1-320, XP002509319 Retrieved from the Internet: URL:http://member.openmobilealliance.org/ftp/Public_documents/LOC/Permanent_documents/OMA-TS-ULP-V2_0-20070905-D.zip> [retrieved on Jan. 7, 2009] [RFC2246].

Translation of Office Action in Russian application 2010116179 corresponding to U.S. Appl. No. 12/189,738, citing KR20070019434, DIERKS The TLS Protocol year 1999 and Open Mobile Alliance UserPlane XP002509319 year 2007 dated Apr. 22, 2011.

Taiwan Search Report—TW097137402—TIPO—May 4, 2012.

* cited by examiner

METHOD FOR SECURE USER PLANE (SUPL) VERSION NEGOTIATION

CROSS REFERENCE TO RELATED APPLICATIONS

This application is a continuation of U.S. patent application Ser. No. 12/189,738, entitled "METHOD FOR SECURE USER PLANE (SUPL) VERSION NEGOTIATION," filed Aug. 11, 2008, now issued as U.S. Pat. No. 8,145,769, which claims priority to U.S. Provisional Patent Application Ser. No. 60/975,454, entitled "LOCATION AND TIME BASED FILITERING OF BROADCASTS," filed Sep. 26, 2007. Both of the applications referenced above are hereby incorporated by reference in their entireties.

BACKGROUND

Field

The subject matter disclosed herein relates to a method of communication protocol negotiation between a terminal and a network entity, such as negotiation of a Secure User Plane (SUPL) version between a SUPL enabled terminal and a network entity.

INFORMATION

The Secure User Plane Location (SUPL) specifications produced by the Open Mobile Alliance (OMA) enable a client application, i.e., a SUPL Agent, to obtain the geographic location of a wireless terminal, i.e., a SUPL Enabled Terminal (SET). They also enable a SET to obtain its own location and the locations of other SETs and to transfer its location to a selected SUPL Agent. Currently, two versions of SUPL are defined in OMA specifications—SUPL version 1.0, which is now fully approved as an OMA Enabler, and SUPL version 2.0. SUPL 1.0 supports many positioning methods but provides only basic location capabilities. SUPL 2.0, on the other hand, contains many more location capabilities including support for periodic, triggered and historic location. It is possible that other versions of SUPL may eventually be developed that would support even more location services.

In order to support a particular location service using SUPL, a SUPL session is typically started between a SET and a SUPL network entity known as a SUPL Location Platform (SLP). For each type of location service, an initial SUPL message is typically sent either from the SET to the SLP or from the SLP to the SET. The message typically includes the version of SUPL intended for the session by the sender. In SUPL, the version may be characterized by a major version number and a minor version number. For example, in SUPL version 1.0, the major version number is "1" and the minor version is "0." In SUPL 2.0, the major version number is "2" and the minor version number is "0." There may also be a third level of SUPL version number, known as a service indicator, appearing after major and minor version numbers. For example, in SUPL version 2.1.0, the major version number is "2," the minor version number is "1," and the service indicator is "0." All three version numbers (major, minor and service indicator) may be conveyed in SUPL messages and hence may be shown in message flow diagrams but only the major version number and minor version number may be utilized for SUPL version negotiation.

If a recipient of the first SUPL message for a new SUPL session supports a version of SUPL with the same major version number as that indicated in the message the recipient typically will continue the SUPL session normally. The SUPL session may be continued even if the supported minor version number is not the same as that indicated in the message (e.g., if the recipient is the SET, it establishes a secure IP connection to the sending SLP and then returns a SUPL message). However, if such a recipient does not support any version of SUPL with the same major version number as that indicated in the received SUPL message, it typically returns a SUPL END message to a sender of the SUPL message indicating a protocol error (i.e., SUPL version not supported) and indicating the version of SUPL that it does support. If such a sender supports this version, it can restart the SUPL session using this SUPL version. Otherwise, the session attempt typically fails.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a method is provided in which a secure user plane location (SUPL) initiation message is transmitted from a network entity to an SUPL entity. The SUPL initiation message may identify a plurality of SUPL versions capable of supporting a desired service. A response may be received from the SUPL entity that is based, at least in part, on an ability of the SUPL entity to support at least one of the plurality of versions.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

A "location" as referred to herein relates to information associated with a whereabouts of an object or thing according to a point of reference. Here, for example, such a location may be represented as geographic coordinates such as latitude and longitude. Alternatively, such a location may be represented as a street address, municipality or other governmental jurisdiction, postal zip code and/or the like. However, these are merely examples of how a location may be represented according to particular embodiments and claimed subject matter is not limited in these respects. A SUPL Enabled Terminal (SET) may determine its location based on navigation signals from a Satellite Positioning System (SPS), such as GPS or Galileo by, for example, correlating pseudorange measurements from several (e.g., four or more) transmitters. Alternatively, such a location may be estimated from a hybrid system in which a position of a cell based transceiver is determined from a combination of at least: i) a time measurement that represents a time of travel of a message in the cell based communication signals between the cell based transceiver and a communication system; and, ii) a time measurement that represents a time of travel of an SPS signal.

Location services based on the location of mobile devices are becoming increasingly widespread. In one implementation, Secure User Plane Location (SUPL) may employ techniques to transfer location information and/or position information. SUPL may be utilized to transfer location information that may be used to compute a target SET's location.

A network entity (e.g., an SLP) and a SET may agree upon a particular SUPL version to utilize for a SUPL session. One technique of negotiating a SUPL version to utilize for a particular SUPL session may entail retrying a SUPL session after a failed attempt at least once, adding extra delay. Such delay may be significant if the first SUPL message, e.g., a SUPL initiation message (i.e., a SUPL INIT), is transferred using a slow capability such as Short Message Service (SMS).

Other SUPL version negotiation methods may also allow an SLP and SET to indicate support for only one version of SUPL. If multiple versions of SUPL exist, an SLP and SET may support the same version but this version might not be indicated. For example, a problem could arise if an SLP starts a session by indicating SUPL 3.0 in an initial SUPL INIT message sent to a SET and the SET responds with a SUPL END message indicating SUPL 2.0. Such an attempt to establish a session could fail if the SET supports SUPL versions 1.0 and 2.0 while the SLP supports versions 1.0, 2.0 and 3.0, even though the session could have been supported using SUPL 1.0 or SUPL 2.0.

Figure 1:
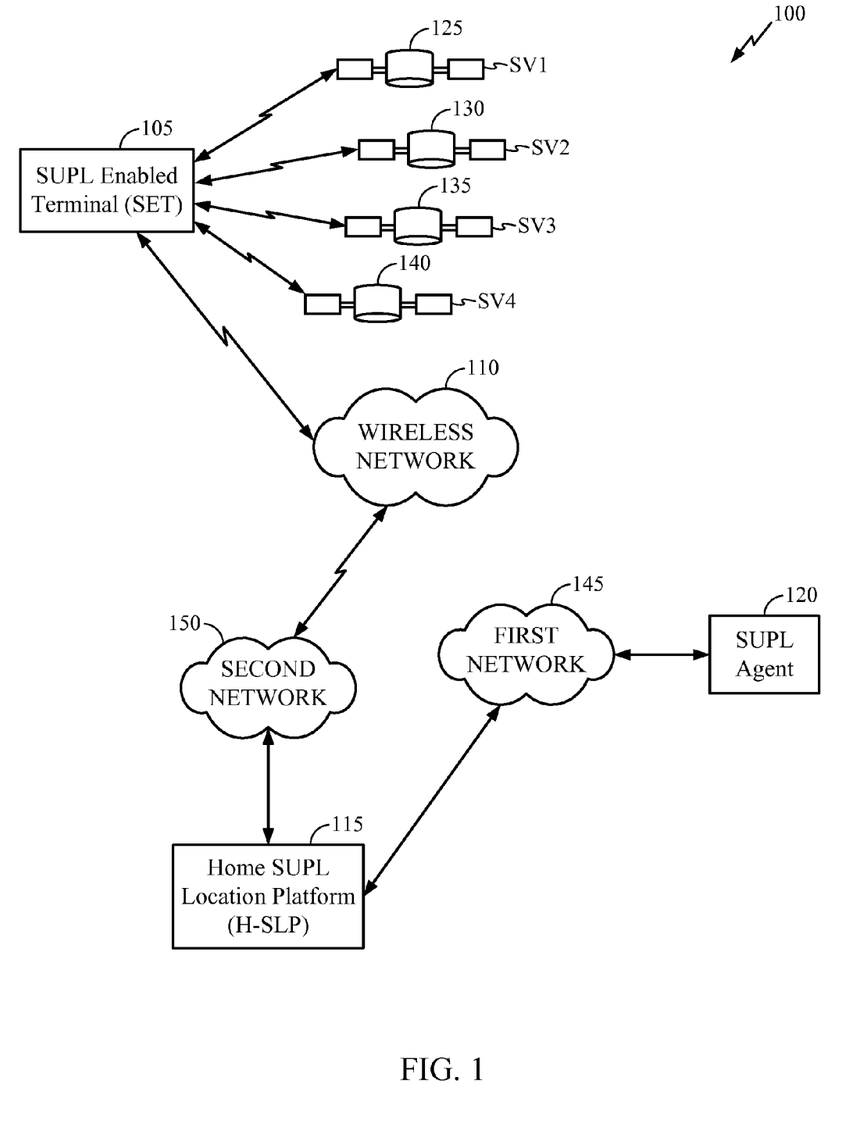
FIG. 1 is a schematic diagram of a system for supporting location of a target SET using an exchange of SUPL information according to one implementation.

FIG. 1 illustrates a system 100 for supporting location of a target SET using an exchange of SUPL information according to one implementation. System 100 may include various entities such as a SET 105, a wireless network 110, a Home SUPL Location Platform (H-SLP) 115, a SUPL agent 120, one or more satellite vehicles (SVs) such as SV1 125, SV2 130, SV3 135, and SV4 140, a first network 145, and a second network 150. Although four SVs are illustrated, it should be appreciated that more or fewer than four satellites may be utilized in the system 100 to provide location data, such as pseudorange measurements, to SET 105. In some implementations, such location data may instead be provided by, for example, terrestrial transmitters such as a base station or other another electronic device, for example, in a wireless local area network (WLAN), wireless wide area network (WWAN) and/or wireless personal area network (WPAN).

In some implementations, SET 105 may comprise a device such as, for example, a laptop computer, a personal digital assistant (PDA), other low duty cycle devices, or a mobile phone device, just to name a few examples. As discussed above, for example, SET 105 may determine its location based on navigation signals from an SPS, such as GPS or Galileo by, for example, obtaining pseudorange measurements to four or more transmitters. Alternatively, SET 105 may determine location based on other techniques, as discussed above.

In one implementation, SUPL agent 120 may request location information for the SET 105. In one implementation, SUPL agent 120 may remotely monitor or track a location of SET 105. For example, in the event that a user transporting SET 105 is lost or experiences a medical emergency, the SUPL agent 120 may desire to determine the location of SET 105. SUPL agent 120 may comprise an application program executed by a remote computer, computing device, or computing platform. SUPL agent 120 may communicate with H-SLP 115 via a first network 145 or networks. First network 145 may comprise a hard-wired network or a wireless network.

H-SLP 115 may receive location requests from SUPL agent 120 and effectively interfaces with SET 105 via wireless network 110. Although a wireless network 110 is illustrated in FIG. 1, it should be appreciated that other types of networks, such as hard-wired, or partially hard-wired, networks may additionally be utilized. Moreover, in some implementations, an Emergency SUPL Location Platform (E-SLP) may be utilized instead of, or in addition to, an H-SLP 115. An E-SLP may determine a location of a SET 105 in an emergency situation, such as for locating a SET 105 in association with an emergency E911 call.

Communication may be initiated between H-SLP 115 and SET 105 by either H-SLP 115 or SET 105. To initiate the communication, in one implementation H-SLP 115 may transmit an SUPL initiation message to SET 105, or SET 105 may transmit an SUPL initiation message to H-SLP 115. H-SLP 115 may be in communication with a second network 150. Second network 150 may be hard-wired or wireless. Second network 150 may be in direct communication with wireless network 110, as shown in FIG. In one implementation, however, the second network 150 may be in indirect communication with the wireless network 110 such as, for example, via the Internet.

Such a SUPL initiation message may include a version of SUPL intended for the session by the sender. As discussed above, a version may be characterized by a major version number and a minor version number. For example, in SUPL version 1.0, the major version number is the first number portion of the version number or "1" and the minor version is the second number portion of the version number or "0." In SUPL 2.0, the major version number is "2" and the minor version number is "0." If a recipient of a first SUPL message for a new SUPL session supports a version of SUPL with the same major version number as that indicated in the message, even if the supported minor version number is not the same as that indicated in the message, the recipient may continue the SUPL session normally. To continue the SUPL session, in some implementations, the recipient, if it is the SET 105, may establish a secure Internet Protocol (IP) connection to an H-SLP 115 and then return a SUPL message.

According to some implementations, a method of negotiating between a SET 105 and an H-SLP 115 is undertaken to determine the SUPL version to be used. A SUPL session may begin following transmission of a SUPL initiation message. Such a SUPL initiation message may be transmitted according to a known SUPL version, such as SUPL 2.0. If such a receiving entity supports the SUPL version of an initiation message, the receiving entity may (e.g., after establishing a secure IP connection with the sending entity if it is a SET 105) transmit a SUPL response message. However, if such a receiving entity does not support the SUPL version specified in the initiation message, it may send a SUPL response to terminate such a session and indicate that a different SUPL version should instead be utilized.

A SET 105 may support one or multiple versions of SUPL. For example, a SET may support only SUPL 1.0 or only SUPL 2.0, whereas other SETs may support both SUPL 1.0 and SUPL 2.0, or possibly additional versions of SUPL. In the event that SET 105 initiates a SUPL session by transmitting a SUPL initiation message to H-SLP 115, and SET 105, for example, supports both SUPL 1.0 and SUPL 2.0, a SUPL initiation message may indicate that SUPL 2.0 is the intended version for the SUPL session. H-SLP 115 may receive the initiation message and continues the SUPL session if it supports SUPL 2.0. If, however, H-SLP 115 only supports SUPL 1.0, it may transmit a SUPL END message to the SET 105, which indicates that the SUPL session has ended. The SUPL END message may indicate a major SUPL version that it supports, which in this example would be SUPL 1.0.

In the event, however, that SET 105 supports only SUPL 1.0, SET 105 may initiate a SUPL session by sending a SUPL initiation message to H-SLP 115 indicating that SUPL 1.0 is the intended SUPL version. Upon receipt, H-SLP 115 may respond to SET 105 and continue the SUPL session in SUPL 1.0.

If a network entity, such as the H-SLP 115, as opposed to the SET 105, initiates a SUPL session, on the other hand, a negotiation process may be streamlined. In accordance with this implementation, a SUPL initiation message may be modified to identify a plurality of SUPL versions capable of supporting a desired service and that are also supported by H-SLP 115. A response may be received from SET 105 that is based on an ability of SET 105 to support at least one of the plurality of versions.

As an example of this method, H-SLP 115 may send a SUPL initiation message (e.g., a SUPL INIT message) with a parameter to indicate the minimum SUPL major version number for which continuation of the session by the SET 105 is possible. In a particular implementation, a SUPL initiation message may be formatted to include several parameter fields. As discussed previously above, the SUPL initiation message may include the intended SUPL major and minor version numbers, e.g., M1 and m1, respectively, expressed in this example as M1.m1 in an existing SUPL version parameter. Here, such a SUPL version parameter therefore may indicate a highest version of SUPL supported by H-SLP 115.

As discussed above, a SUPL initiation message is adapted to include an additional parameter field to indicate a minimum SUPL major version M2 for which continuation of the SUPL session by SET 105 is possible. In one implementation, an intended SUPL session can be continued by SET 105 using any SUPL major version number between M2 and M1 inclusive, and any minor SUPL version number without restriction.

In one example, SET 105 may support only SUPL 2.0, whereas H-SLP 115 may support SUPL 3.0. H-SLP 115 may transmit a SUPL initiation message to SET 105 indicating such an intended version of SUPL is SUPL 3.0, and that the lowest supported version is SUPL 2.0. In this case, the SUPL initiation message sent by H-SLP 115 would indicate a value of 3 for M1, a value of 0 for m1 and a value of 2 for M2. In this example, SET 105 may continue such a session because the major version of SUPL that it supports is 2, which lies between M2 and M1. SET 105 may thus respond to H-SLP 115 with a message indicating use of SUPL 2.0, which in this case would be supported by H-SLP 115. Any parameters or parameter values included by H-SLP 115 in the SUPL initiation message that were defined for SUPL 3.0, but not for SUPL 2.0, may be ignored by SET 105 (i.e., because it does not support SUPL 3.0). H-SLP 115 may then continue the SUPL 2.0 session following the response from SET 105 as if these parameters and parameter values had not originally been sent. In this particular example, the session was initiated by the SUPL initiation message according to SUPL 3.0. Such a SUPL session may be continued according to SUPL 2.0 by SET 105. By continuing the SUPL session in SUPL 2.0, delays and excessive bandwidth usage may be avoided that might occur if the session were to end upon SET 105 receiving the SUPL initiation message and responding (e.g., with a SUPL END message) to end the session and indicate that the only SUPL version supported by SET 105 is SUPL 2.0.

In the event that, for example, SET 105 utilizes a version of SUPL for which minimum supported SUPL version parameters are undefined, such as SUPL 1.0, for example, SET 105 may effectively ignore such parameters. In such case, SET 105 may operate as though minimum support SUPL version parameters were not received, and SET 105 may therefore respond with a SUPL END message, as previously discussed, which indicates a SUPL version supported by SET 105.

Version negotiation for SUPL 1.0 may be defined by OMA and may not be changed. However, backward compatibility of versions of SUPL higher than SUPL 1.0 with an entity supporting SUPL 1.0 may be achieved as discussed below.

For a network initiated SUPL session between H-SLP 115 supporting a version of SUPL above 1.0 and SET 105 that supports only 1.0, SET 105 may respond to a first SUPL initiation message from H-SLP 115 with a SUPL END message indicating SUPL 1.0 is supported. H-SLP 115 may then restart the session using SUPL 1.0 if it is supported and if SUPL 1.0 is compatible with the intended SUPL service.

For a network initiated SUPL session between an H-SLP 115 supporting only SUPL 1.0 and a SET 105 that supports only a version higher than SUPL 1.0, SET 105 may recognize that H-SLP 115 only supports SUPL 1.0 and may respond to a SUPL initiation message from H-SLP 115 with a SUPL END indicating its supported SUPL version and the session will end (i.e., because the SUPL session cannot be retried in this example).

In another example, a SET 105 supporting only SUPL 1.0 may initiate a SUPL session with H-SLP 115 supporting a version of SUPL above SUPL 1.0. In such a case, SET 105 may indicate SUPL 1.0 is a supported version of SUPL in a SUPL initiation message and H-SLP 115, recognizing this, may either continue the session using SUPL 1.0 or reply with a SUPL END message to terminate the session attempt.

In another implementation, SET 105 supporting only SUPL 2.0 or higher may initiate a SUPL session with H-SLP 115 supporting only SUPL 1.0. In such case, H-SLP 115 may respond to a SUPL initiation message from SET 105 with a SUPL END message indicating its support for SUPL 1.0, allowing SET 105 to retry the session if it supports SUPL 1.0.

In one implementation, processes described above may ensure that H-SLP 115 and SET 105 agree on the same SUPL major version number to be used for a SUPL session, if such a common version number exists. This may avoid incompatible support for messages and procedures at both SET 105 and H-SLP 115 if, for example, SET 105 and H-SLP 115 were to otherwise attempt to support a session using different SUPL versions. If the H-SLP 115 and SET 105 do not support the same minor version for an agreed major version, the session can still continue—e.g. as already defined for SUPL 1.0. However, it may be more efficient if the same minor version of SUPL is supported by both SET 105 and H-SLP 115. To help ensure that the same minor version of SUPL is used, once the major version is determined, both SET 105 and H-SLP 115 may begin by indicating (or expecting to indicate) the highest SUPL minor version they each support for the agreed-upon major version. Additionally, as between SET 105 and H-SLP 115, the entity supporting the higher minor version number may reduce the minor version it will use to that indicated by the other end if it is supported.

In one implementation, a method may be used to ensure that the same or a compatible minor SUPL version is used. This may be applicable when H-SLP 115 initiates a SUPL session by indicating in a SUPL initiation message the intended SUPL major and minor versions M1.m1 and a minimum SUPL major version M2. Assuming SET 105 supports a major version of SUPL M that is between M2 and M1 inclusive (i.e., where M2≦M≦M1), SET 105 may respond to H-SLP 115 indicating a SUPL major version M and some preferred minor version m (e.g., m may be the lowest minor version of SUPL supported by SET 105 for major SUPL version M). H-SLP 115 may then continue the session using SUPL major version M and minor version m, if supported. If minor SUPL version m is not supported, H-SLP 115 may use a minor version lower than m if supported or a minor version higher than m.

Figure 2:
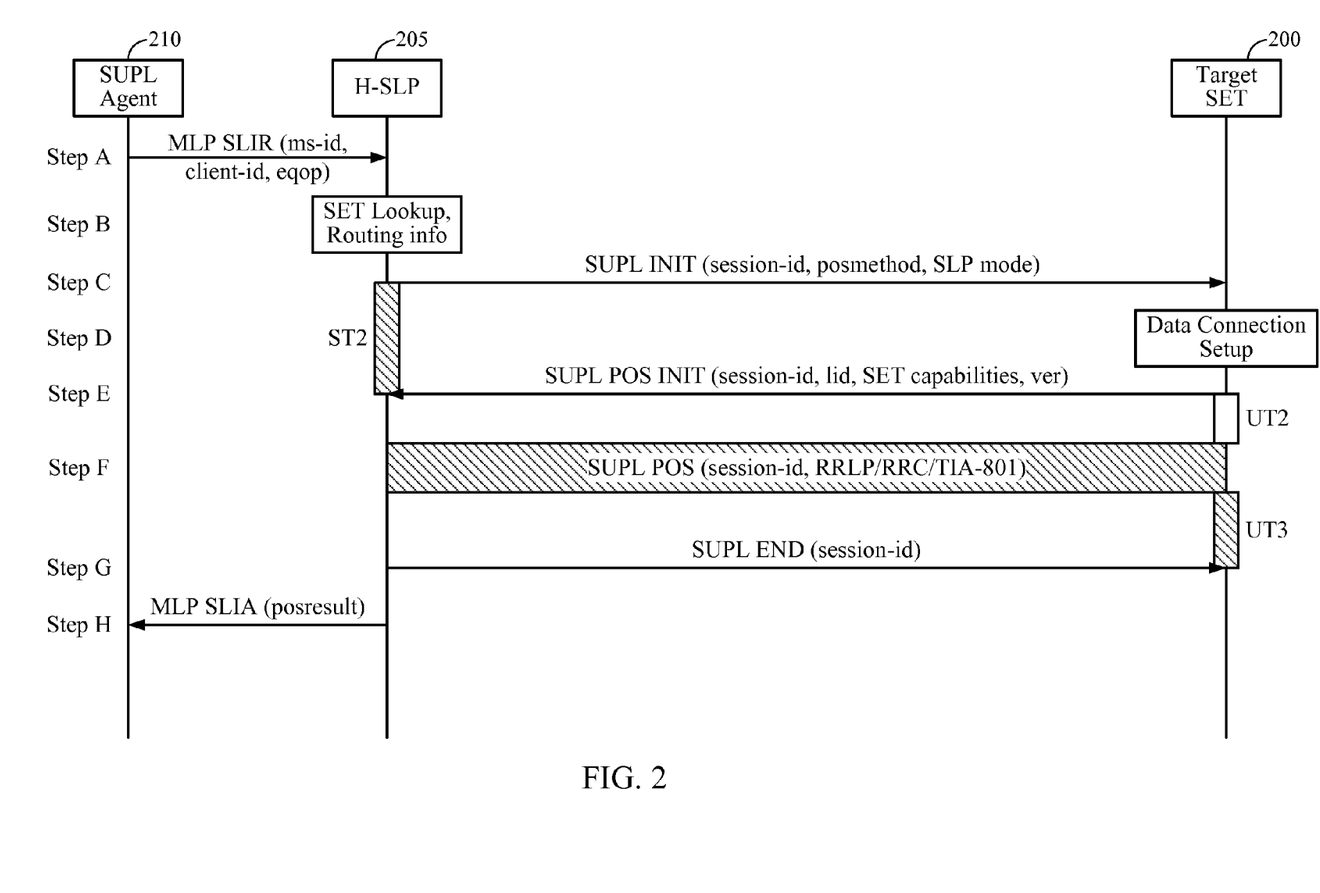
FIG. 2 is a signal flow diagram illustrating a target SET utilizing the same SUPL version as is requested by a home SLP (H-SLP) according to one implementation.

FIG. 2 is a signal flow diagram illustrating a target SET 200 utilizing the same SUPL version as is requested by an H-SLP 205 according to one implementation. FIG. 2 illustrates signal flows in a SUPL session among a SUPL agent 210, an H-SLP 205, and a target SET 200 in one particular implementation. In this example, SUPL agent 210 may contact H-SLP 205 to determine the location of target SET 200. In one implementation, SUPL agent 210, H-SLP 205, and target SET 200 of FIG. 2 correspond to SUPL agent 120, H-SLP 115, and SET 105 of FIG. 1.

First, at step A, SUPL Agent 210 transmits a "mobile location platform standard location immediate request" (MLP-SLIR) message/instruction to a H-SLP 205 with which SUPL Agent 210 is associated. The MLP-SLIR message may include an identifier for the target SET 200 (i.e., a mobile station identifier (ms-id)) for which location information is desired and an identifier for SUPL Agent 210 (i.e., client-id). Upon receipt, H-SLP 205 may authenticate SUPL Agent 210 and check whether SUPL Agent 210 is authorized for the service it requests, based on the client-id received. H-SLP 205 may also apply subscriber privacy against the client-id based on the received ms-id.

If a previously computed position meeting a requested quality of position (QoP) threshold is available at H-SLP 205 and no notification and verification is required, H-SLP 205 may proceed directly to step H. If, on the other hand, notification and verification or notification only is required, the process proceeds to step B.

At step B, H-SLP 205 may verify that target SET 200 is currently not SUPL roaming H-SLP 205 may also verify that target SET 200 supports SUPL. If target SET 200 supports SUPL and is not roaming, processing proceeds to step C.

At step C, H-SLP 205 may initiate a SUPL session with SET 200 by transmitting a SUPL initiation message (SUPL INIT), which may be a wireless application protocol (WAP) PUSH or a Short Message Service (SMS) Trigger. A SUPL INIT message may contain at least session-id, proxy/non-proxy mode indicator and an intended positioning method in one particular implementation. A SUPL INIT message may also contain a protection level and desired QoP. The protection level indicates a level of protection for a SUPL INIT message. If the result of the privacy check in step A indicates that notification or verification to the target subscriber is needed, H-SLP 205 may also include a Notification element in the SUPL INIT message. Before a SUPL INIT message is sent, H-SLP 205 may also compute and store a hash of the message.

If, in step A, H-SLP 205 decided to use previously computed location or position, a SUPL INIT message may indicate this in a "no position" posmethod parameter value and target SET 200 may respond with a message ending the SUPL session (i.e., SUPL END). Such a SUPL END message may include the results of the verification process (e.g., access granted, or access denied). If no explicit verification is required (i.e., notification only) target SET 200 may respond with a SUPL END message. H-SLP 205 may then directly proceed to step H.

It should be appreciated that target SET 200 may perform a data connection setup procedure prior to sending a SUPL END message, discussed below with respect to step D. Target SET 200 may also use the procedures described below in step E to establish a secure Internet Protocol (IP) connection to H-SLP 205.

Next, at step D, if a SUPL INIT message is received by the target SET 200, such message may either attach itself to a Packet Data Network if it is not attached at the time being or establish a circuit switched data connection. If a protection level parameter with a value other than "no protection" is received in a SUPL INIT message, target SET 200 may use such parameter to determine whether the SUPL INIT message is authentic.

At step E, target SET 200 may evaluate notification rules of the particular version of SUPL employed by target SET 200 and follow the appropriate actions. Target SET 200 may also check the proxy/non-proxy mode indicator to determine whether H-SLP 205 uses proxy or non-proxy mode. In this example, proxy mode is used, and target SET 200 may establish a secure IP connection to H-SLP 205 using an SLP address that has been provisioned by a home network for target SET 200. Target SET 200 may subsequently send a SUPL response to H-SLP 205 (i.e., SUPL POS INIT) with positioning information. Target SET 200 may send a SUPL POS INIT message even if target SET 200 supports positioning technologies that do not include the intended positioning method indicated in the SUPL INIT message.

A SUPL POS INIT message may contain at least a session-id, target SET 200 capabilities, and a hash of the received SUPL INIT message (ver) and location identifier (lid). Target SET 200 capabilities may include supported positioning methods (e.g., SET-Assisted A-GPS, SET-Based A-GPS) and associated positioning protocols (e.g., Radio Resource Location Services (LCS) Protocol (RRLP), Radio Resource Control (RRC), and Telecommunications Industry Association (TIA)-801). Target SET 200 may provide Network Measurement Resport (NMR) information specific for the radio technology being used. Target SET 200 may provide its position, if this is supported. Target SET 200 may also set a Requested Assistance Data element in a SUPL POS INIT message.

If a position retrieved from or calculated based on information received in the SUPL POS INIT message is available that meets a required QoP, processing may proceed directly proceed to step G without H-SLP 205 engaging in a SUPL positioning (POS) session at step F, as discussed below.

At step F, H-SLP 205 may check that a hash of a SUPL INIT message matches the one it has computed for this particular session. Based on a SUPL POS INIT message including posmethod(s) supported by target SET 200, H-SLP 205 may then determine the posmethod. If required for the posmethod H-SLP 205 may use the supported positioning protocol from a SUPL POS INIT message.

Target SET 200 and H-SLP 205 may exchange several successive positioning procedure messages. H-SLP 205 may calculate the position estimate for target SET 200 based on the received positioning measurements (SET-Assisted). Alternatively, target SET 200 may calculate the position estimate based on assistance obtained from H-SLP 205 (SET-Based).

At step G, once the position calculation is completed, H-SLP 205 sends a SUPL END message to target SET 200 informing it that no further positioning procedure will be started and that the location session is finished. Target SET 200 may release the secure IP connection to H-SLP 205 and release all resources related to this session.

At step H, H-SLP 205 may send a position estimate back to SUPL Agent 210 in a Mobile Location Protocol (MLP) Standard Location Immediate Answer (SLIA) message and the H-SLP 205 may release all resources related to this session.

Figure 3:
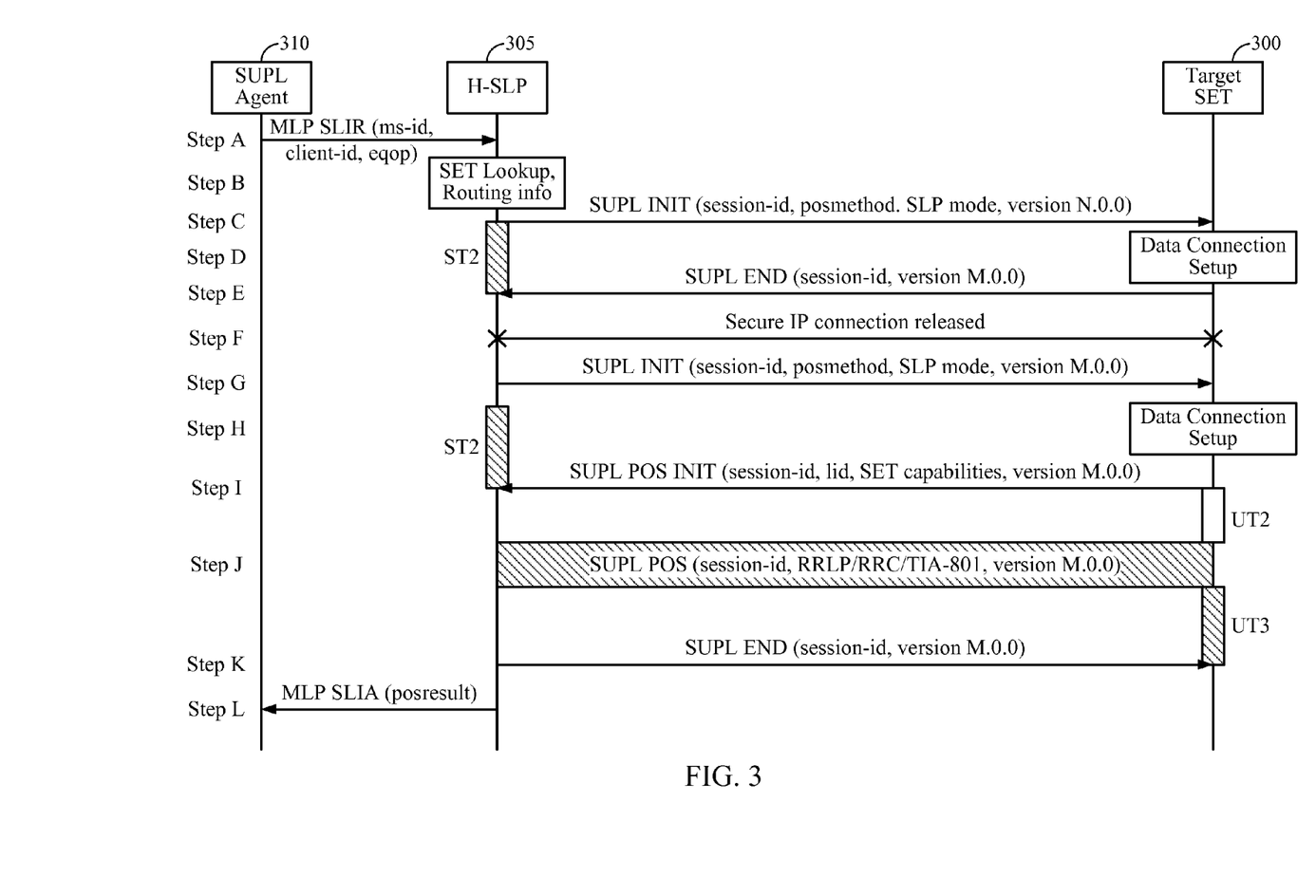
FIG. 3 is a signal flow diagram illustrating a target SET utilizing a lower SUPL version than is initially requested by an H-SLP according to one implementation.

FIG. 3 is a signal flow diagram illustrating a target SET 300 utilizing a lower SUPL version than is initially requested by an H-SLP 305 according to one implementation. In this implementation, target SET 300 utilizes SUPL version M.0.0, and H-SLP 305 supports SUPL versions up to version N.0.0, where N>M. For example, N may be "2," and M may be "1".

FIG. 3 illustrates signal flows in a SUPL session among a SUPL agent 310, an H-SLP 305, and a target SET 300 in one particular implementation. In this example, SUPL agent 310 may contact H-SLP 305 to determine the location of target SET 300. In one implementation, SUPL agent 310, H-SLP 305, and target SET 300 of FIG. 3 correspond to SUPL agent 120, H-SLP 115, and SET 105 of FIG. 1.

First, at step A, SUPL Agent 310 transmits a "mobile location platform standard location immediate request" (MLP-SLIR) message/instruction to a H-SLP 305 with which SUPL Agent 310 is associated. The MLP-SLIR message may include an identifier for the target SET 300 (i.e., a mobile station identifier (ms-id)) for which location information is desired and an identifier for SUPL Agent 310 (i.e., client-id). Upon receipt, H-SLP 305 may authenticate SUPL Agent 310 and check whether SUPL Agent 310 is authorized for the service it requests, based on the client-id received. H-SLP 305 may also apply subscriber privacy against the client-id based on the received ms-id.

If a previously computed position meeting a requested quality of position (QoP) threshold is available at H-SLP 305 and no notification and verification is required, H-SLP 305 may proceed directly to step L. If, on the other hand, notification and verification or notification only is required, the process proceeds to step B.

At step B, H-SLP 305 may verify that target SET 300 is currently not SUPL roaming H-SLP 305 may also verify that target SET 300 supports SUPL. If target SET 300 supports SUPL and is not roaming, processing proceeds to step C.

At step C, H-SLP 305 may initiate a SUPL session with SET 300 by transmitting a SUPL initiation message (SUPL INIT), which may be a wireless application protocol (WAP) PUSH or a Short Message Service (SMS) Trigger. A SUPL INIT message may contain at least session-id, proxy/non-proxy mode indicator, an intended positioning method, and may indicate SUPL version N.0.0 in one particular implementation. A SUPL INIT message may also contain a protection level and desired QoP. If the result of the privacy check in step A indicates that notification or verification to the target subscriber is needed, H-SLP 305 may also include a Notification element in the SUPL INIT message. Before a SUPL INIT message is sent, H-SLP 305 may also compute and store a hash of the message.

Next, in step D, target SET 300 may either attach itself to a Packet Data Network if it is not attached at the time or establish a circuit switched data connection. If a protection level parameter with a value other than "no protection" is received in a SUPL INIT message, target SET 300 may use such parameter to determine whether the SUPL INIT message is authentic.

At step E, target SET 300 may evaluate notification rules of the particular version of SUPL employed by target SET 300 and follow the appropriate actions. Target SET 300 may also check the proxy/non-proxy mode indicator to determine whether H-SLP 305 uses proxy or non-proxy mode. In this example, proxy mode is used, and target SET 300 may establish a secure IP connection to H-SLP 305 using an SLP address that has been provisioned by a home network for target SET 300. Target SET 300 may subsequently send a SUPL END message to the H-SLP 305 to indicate that version M.0.0 is to be used for a SUPL session.

Next, at step F, the secure IP connection between the H-SLP 305 and target SET 300 may be released. Either H-SLP 305 or target SET 300 may release the secure IP connection. At step G, H-SLP 305 may initiate another SUPL session with SET 300 by transmitting a SUPL initiation message (SUPL INIT) in which SUPL version M.0.0 is indicated.

As discussed above, proxy mode may be used in this example, and target SET 300 may establish a secure IP connection to H-SLP 305 in step H using an SLP address that has been provisioned by a home network for target SET 300. Target SET 300 may subsequently send a SUPL response to H-SLP 305 (i.e., SUPL POS INIT) in step I with positioning information. Target SET 300 may send a SUPL POS INIT message even if target SET 300 supports positioning technologies that do not include the intended positioning method indicated in the SUPL INIT message.

A SUPL POS INIT message may contain at least a session-id, target SET 300 capabilities, and a hash of the received SUPL INIT message (ver), location identifier (lid), and SUPL version M.0.0. Target SET 300 capabilities may include supported positioning methods (e.g., SET-Assisted A-GPS, SET-Based A-GPS) and associated positioning protocols (e.g., Radio Resource Location Services (LCS) Protocol (RRLP), Radio Resource Control (RRC), and Telecommunications Industry Association (TIA)-801). Target SET 300 may provide Network Measurement Resport (NMR) information specific for the radio technology being used. Target SET 300 may provide its position, if this is supported. Target SET 300 may also set a Requested Assistance Data element in a SUPL POS INIT message.

If a position retrieved from or calculated based on information received in the SUPL POS INIT message is available that meets a required QoP, processing may directly proceed to step K without H-SLP 305 engaging in a SUPL positioning (POS) session at step J, as discussed below.

At step J, H-SLP 305 may check that a hash of a SUPL INIT message matches the one it has computed for this particular session. Based on a SUPL POS INIT message including posmethod(s) supported by target SET 300, H-SLP 305 may then determine the posmethod. If required for the posmethod H-SLP 305 may use the supported positioning protocol from a SUPL POS INIT message.

Target SET 300 and H-SLP 305 may exchange several successive positioning procedure messages. H-SLP 305 may calculate the position estimate for target SET 300 based on the received positioning measurements (SET-Assisted). Alternatively, target SET 300 may calculate the position estimate based on assistance obtained from H-SLP 305 (SET-Based).

At step K, once the position calculation is completed, H-SLP 305 sends a SUPL END message to target SET 300 informing it that no further positioning procedure will be started and that the location session is finished. Target SET 300 may release the secure IP connection to H-SLP 305 and release all resources related to this session.

At step L, H-SLP 305 may send a position estimate back to SUPL Agent 310 in a Mobile Location Protocol (MLP) Standard Location Immediate Answer (SLIA) message and the H-SLP 305 may release all resources related to this session. In this example, H-SLP 305 and SET 300 succeed in negotiating the agreed SUPL version M.0.0 to be used for the SUPL session but at the cost of additional SUPL signaling (e.g. SUPL END in step E and SUPL INIT in step G) and additional IP connection setup and release (e.g. in steps D and F) that are not needed when the SUPL version initially proposed by the H-SLP is supported by the SET such as, e.g., in an example as discussed above with respect to FIG. 2.

Figure 4A:
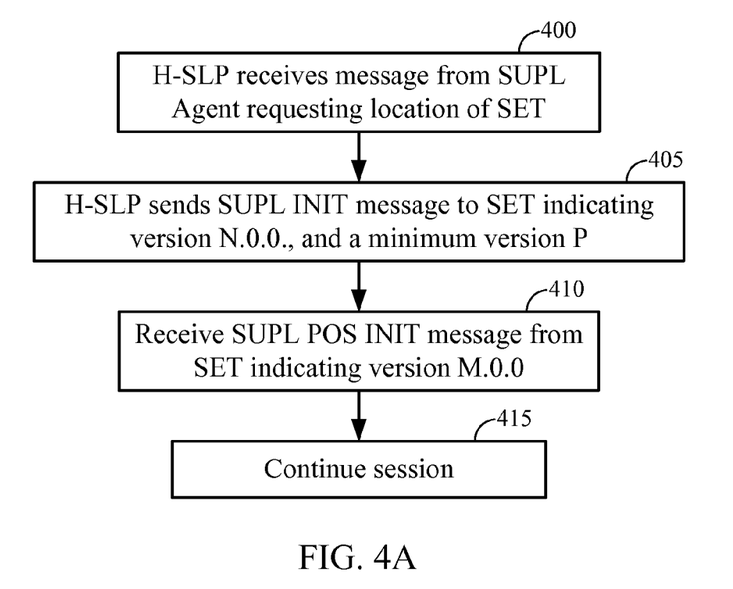
FIG. 4A is a flow diagram illustrating a process of SUPL version negotiation performed by an H-SLP with a SET if such an H-SLP and SET utilize SUPL 2.0, or a higher version of SUPL, according to one particular implementation.
Figure 4B:
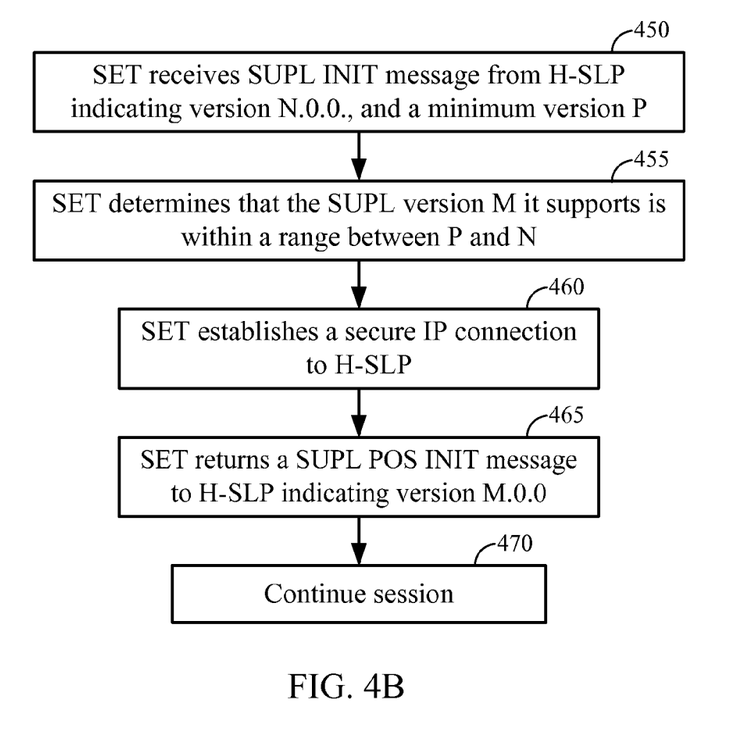
FIG. 4B is a flow diagram illustrating a process of SUPL version negotiation performed by a SET with an H-SLP if such an H-SLP and SET utilize SUPL 2.0, or a higher version of SUPL, according to one particular implementation.

FIGS. 4A and 4B are flow diagrams illustrating a process of SUPL version negotiation performed between an H-SLP and a SET that may be performed more quickly than, for example, a process as exemplified in FIG. 3.

FIG. 4A is a flow diagram illustrating a process of SUPL version negotiation performed by an H-SLP with a SET if both the H-SLP and SET utilize SUPL 2.0, or a higher version of SUPL, according to one particular implementation. In one particular embodiment, SET 105, H-SLP 115 and SUPL Agent 120 shown in FIG. 1 may be utilized in such process. First, at step 400, H-SLP 115 receives a message/instruction from a SUPL Agent 120 to request location information corresponding to SET 105. In this example, SET 105 supports SUPL M.0. Next, at step 405, H-SLP 115 sends a SUPL INIT message to SET 105 indicating that an intended version of SUPL for a SUPL session is SUPL N.0.0, where N>1. The SUPL INIT message also indicates a minimum supported version P, where N>M≧P≧1. Information corresponding to the minimum supported version P may be included in a data field of a SUPL INIT message.

Next, at step 410, H-SLP 115 receives a SUPL POS INIT message indicating that SUPL M.0.0 is supported by SET 105 and that the session can be continued using this SUPL version. Finally, at step 415, the SUPL session may continue and location information may be transferred to H-SLP 115 from SET 105, and eventually from H-SLP 115 back to SUPL Agent 120.

FIG. 4B is a flow diagram illustrating a process of SUPL version negotiation performed by a SET with an H-SLP if both the H-SLP and SET utilize SUPL 2.0, or a higher version of SUPL, according to one particular implementation. In one particular embodiment, SET 105, H-SLP 115 and SUPL Agent 120 shown in FIG. 1 may be utilized in such process.

First, at step 450, SET 105 receives a SUPL INIT message from H-SLP 115 indicating that an intended version of SUPL for a SUPL session is SUPL N.0.0, where N>1. The SUPL INIT message also indicates a minimum supported version P, where N>M≧P≧1. Information corresponding to the minimum supported version P may be included in a data field of a SUPL INIT message.

Next, at step 455, SET 105 determines whether a SUPL version M that it supports is within the inclusive range between P and N. If M is within the range, SET 105 subsequently establishes a secure IP connection to H-SLP 115 at step 460.

Next, at step 465, SET 105 may return a SUPL POS INIT message to H-SLP 115 indicating that SUPL M.0.0 is supported and that the session can be continued under this SUPL version. Finally, at step 470, the SUPL session may continue and location information may be transferred from SET 105 to H-SLP 115.

Such methods of SUPL negotiation for a SET 105 utilizing SUPL 2.0 or higher discussed above with respect to FIGS. 4A and 4B are streamlined as opposed to a method of SUPL negotiation for a SET 105 based on SUPL 1.0, as is discussed above with respect to FIG. 3. Because the minimum supported SUPL version is included in the SUPL INIT message in the process shown in FIGS. 4A and 4B, a session in which SET 105 supports only a version of SUPL below the version intended by H-SLP 115 can be continued in the version supported by SET 105, provided the version supported by SET 105 is no lower than the minimum major version indicated in the SUPL INIT message. Accordingly, such negotiation can be performed within a single SUPL session and a single secure IP connection is established. A negotiation based on the rules in SUPL 1.0, on the other hand, may require two SUPL sessions and the establishment of two separate secure IP connections.

Figure 5:
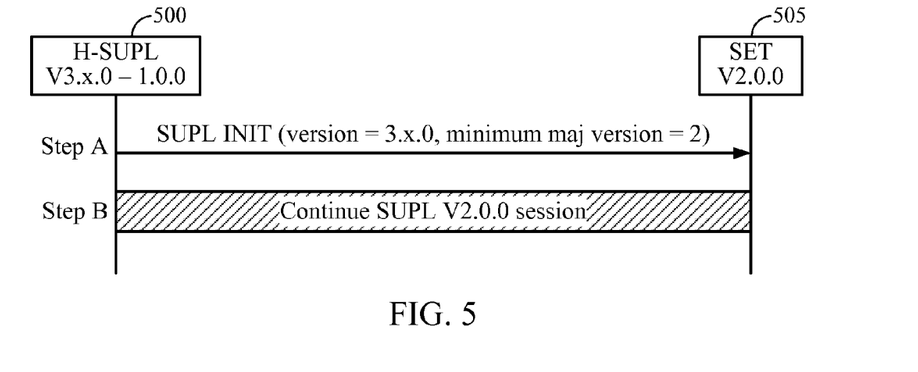
FIGS. 5-10 are message flow diagrams illustrating messages transmitted between an H-SLP and a SET according to at least one implementation.
Figure 6:
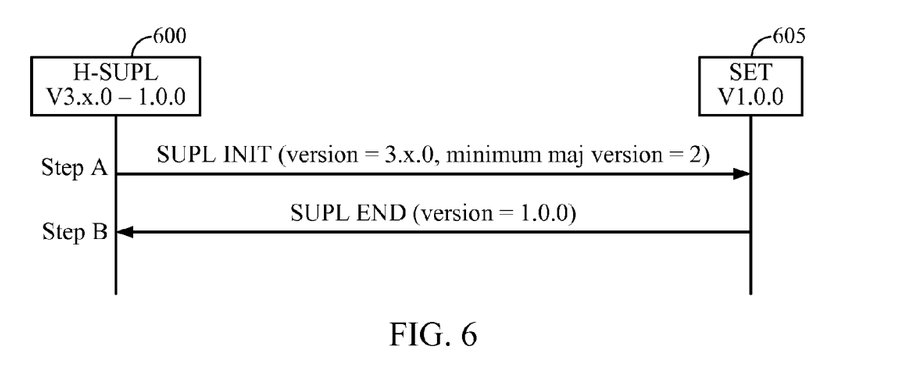
Figure 7:
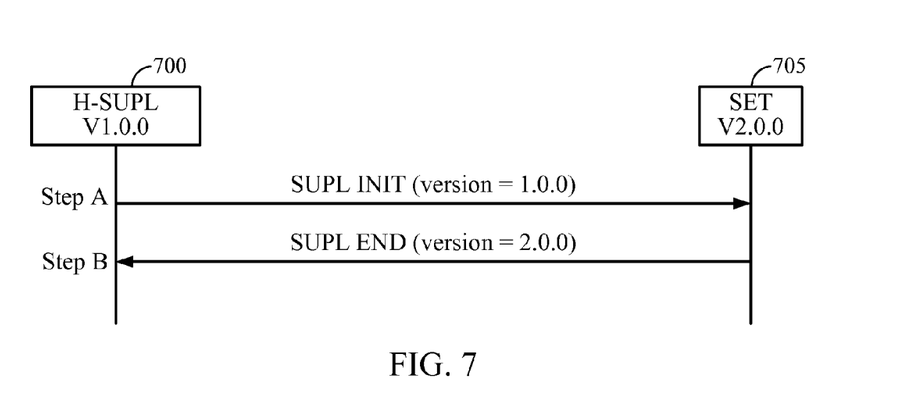
Figure 8:
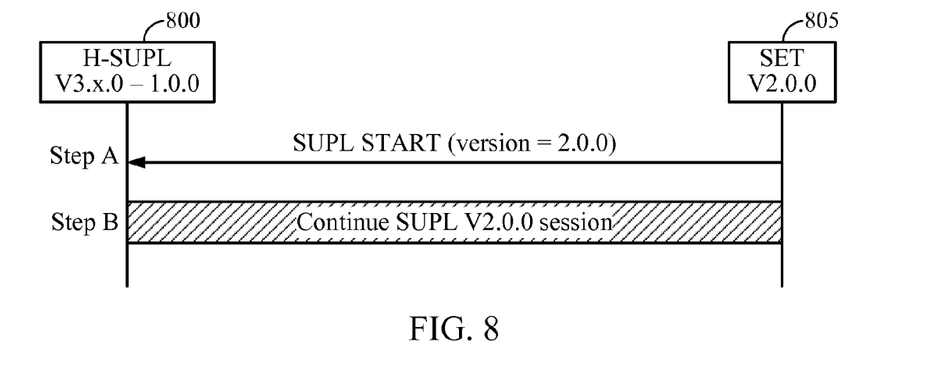
Figure 9:
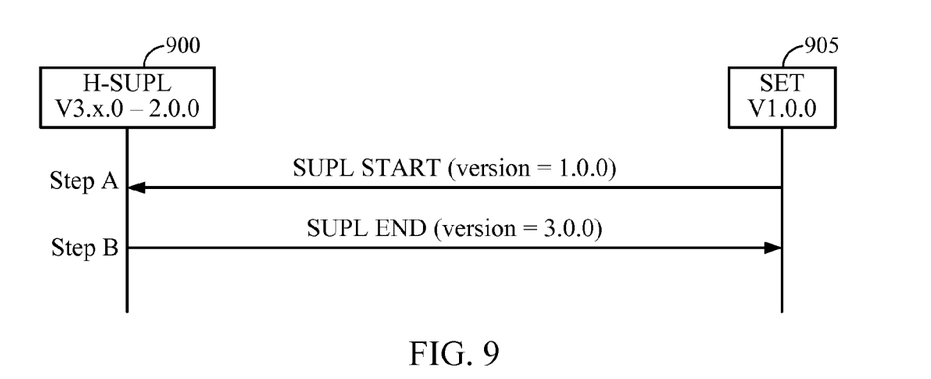
Figure 10:
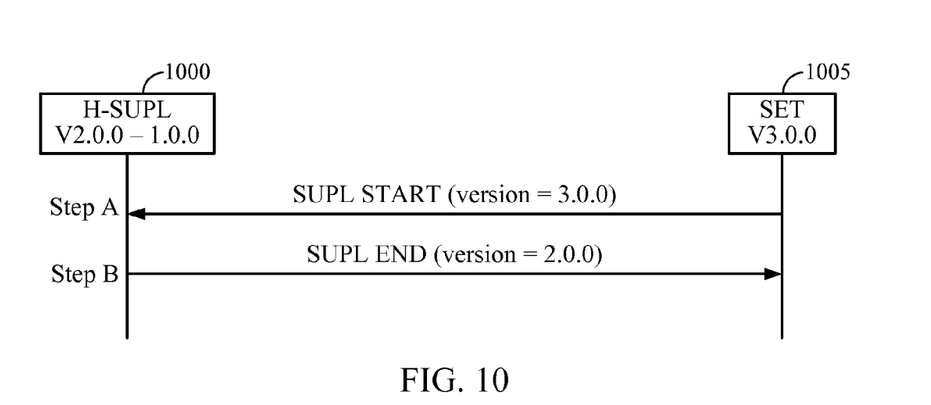

FIGS. 5-10 are message flow diagrams illustrating messages transmitted between an H-SLP and a SET according to at least one implementation. In some implementations, an E-SLP may be utilized instead of an H-SLP. In FIGS. 5-7, an H-SLP sends a SUPL INIT message to a SET. In FIGS. 8-10, on the other hand, a SET initiates the communication, sending a SUPL START message to an H-SLP.

In FIG. 5, H-SLP 500 supports SUPL versions between version 3.x and 1.0. SET 505 on the other hand, supports only SUPL 2.0 in this example. In this example, a SUPL INIT message may be transmitted from H-SLP 500 to SET 505 at step A indicating that the desired version is SUPL 3.x, and the minimum major version is 2, which is equivalent to indicating a minimum version of SUPL 2.0. In this example, although H-SLP 500 supports SUPL 1.0, H-SLP 500 indicates that the minimum version is SUPL 2.0 because, for example, a location service desired from SET 505 is not provided in SUPL 1.0. At step B, SET 505 may respond back to H-SLP 500 with a SUPL 2.0 message (e.g., a SUPL POS INIT message according to SUPL 2.0) and the SUPL session may continue.

In FIG. 6, H-SLP 600 supports SUPL versions between version 3.x and 1.0. SET 605, on the other hand, supports only SUPL 1.0 in this example. In this example, a SUPL INIT message may be transmitted from H-SLP 600 to SET 605 at step A indicating that the desired version is SUPL 3.x, and the minimum version in SUPL 2.0. At step B, SET 605 may respond back to H-SLP 600 with a SUPL END message indicating that the SUPL 1.0 is the required SUPL version for a SUPL session, and the session may end.

In FIG. 7, H-SLP 700 supports only SUPL 1.0. SET 705, on the other hand, supports only SUPL 2.0 in this example. In this example, a SUPL INIT message may be transmitted from H-SLP 700 to SET 705 at step A indicating that the desired version is SUPL 1.0. At step B, SET 705 may respond back to H-SLP 700 with a SUPL END message indicating that SUPL 2.0 is the required SUPL version for a SUPL session, and the session may end.

In FIG. 8, H-SLP 800 supports SUPL versions between version 3.x and 1.0. SET 805, on the other hand, supports only SUPL 2.0 in this example. In this example, a SUPL START message may be transmitted from SET 805 to H-SLP 800 at step A. The SUPL START message may indicate that SUPL 2.0 is the version supported by SET 805. In this case, H-SLP 800 can either respond to SET 805 with a message in SUPL 2.0 (e.g., a SUPL RESPONSE message according to SUPL 2.0) or end the communication. The session may continue in SUPL 2.0 at step B in this example because H-SLP 800 supports SUPL 2.0.

In FIG. 9, H-SLP 900 supports SUPL versions between version 3.x and 2.0. SET 905, on the other hand, supports only SUPL 1.0 in this example. In this example, a SUPL START message may be transmitted from SET 905 to H-SLP 900 at step A. The SUPL START message may indicate that SUPL 1.0 is the version supported by SET 905. In this case, H-SLP 900 responds with a SUPL END message in SUPL 3.0 at step B because H-SLP 900 does not support SUPL 1.0.

In FIG. 10, H-SLP 1000 supports SUPL versions between version 2.0 and 1.0. SET 1005, on the other hand, supports only SUPL 3.0 in this example. In this example, a SUPL START message is transmitted from SET 1005 to H-SLP 1000 at step A. The SUPL START message may indicate that SUPL 3.0 is the version supported by SET 1005. In this case, H-SLP 1000 may respond with a SUPL END message in SUPL 2.0 at step B because H-SLP 115 does not support SUPL 3.0.

Figure 11:
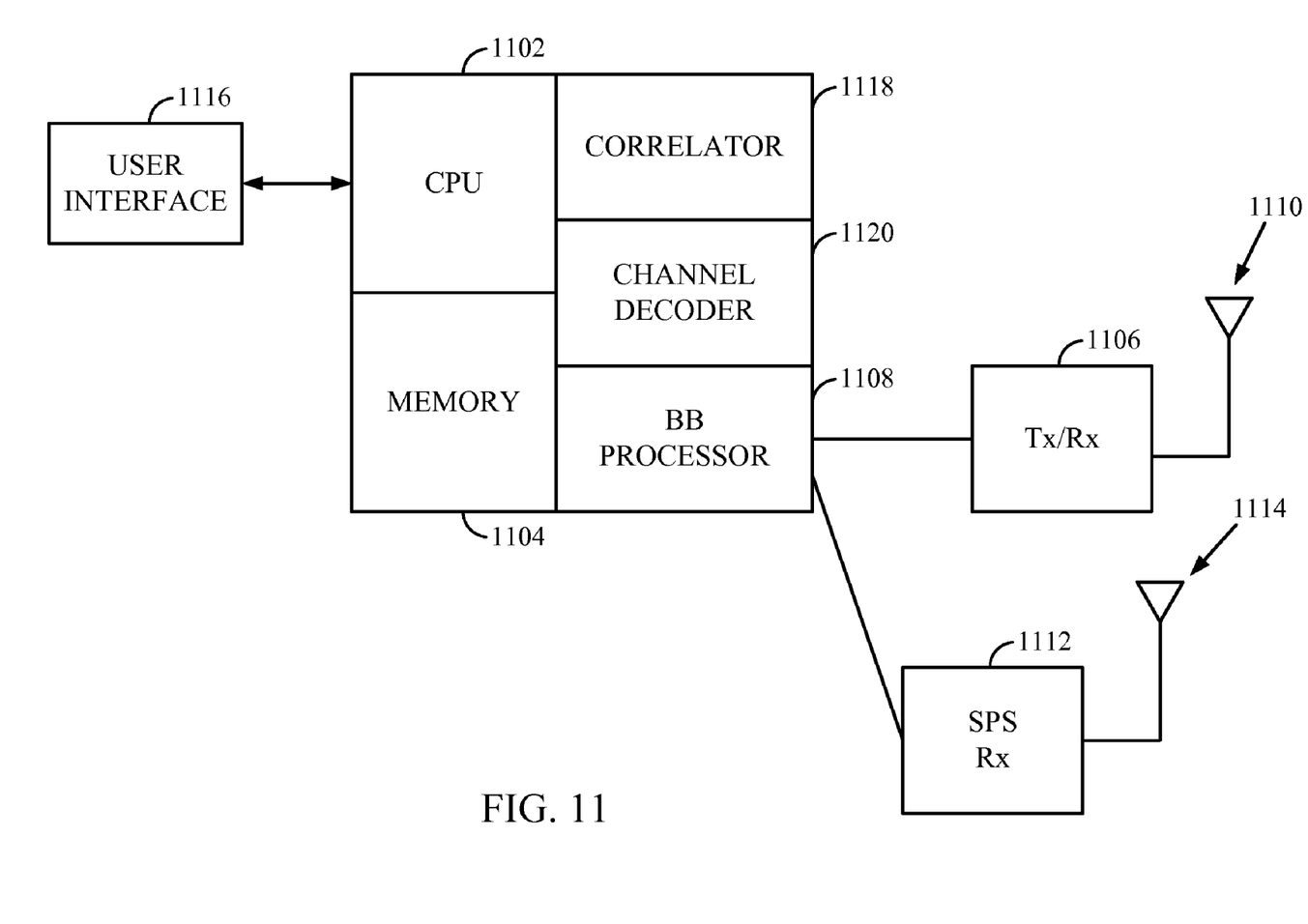
FIG. 11 is a schematic diagram of a SET according to one implementation.

FIG. 11 shows a particular implementation of a SET in which radio transceiver 1106 may be adapted to modulate an RF carrier signal with baseband information, such as voice or data, onto an RF carrier, and demodulate a modulated RF carrier to obtain such baseband information. An antenna 1110 may be adapted to transmit a modulated RF carrier over a wireless communications link and receive a modulated RF carrier over a wireless communications link.

Baseband processor 1108 may be adapted to provide baseband information from CPU 1102 to transceiver 1106 for transmission over a wireless communications link. Here, CPU 1102 may obtain such baseband information from an input device within user interface 1116. Baseband processor 1108 may also be adapted to provide baseband information from transceiver 1106 to CPU 1102 for transmission through an output device within user interface 1116.

SPS receiver (SPS Rx) 1112 may be adapted to receive and demodulate transmissions from transmitters through SPS antenna 1114, and provide demodulated information to correlator 1118. Correlator 1118 may be adapted to derive correlation functions from the information provided by receiver 1112. For a given pseudo noise (PN) code, for example, correlator 1118 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 1118 may also be adapted to derived pilot-related correlation functions from information relating to pilot signals provided by transceiver 1106. This information may be used by a subscriber station to acquire wireless communications services.

Channel decoder 1120 may be adapted to decode channel symbols received from baseband processor 1108 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1120 may comprise a turbo decoder.

Memory 1104 may be adapted to store machine-readable instructions, which are executable to perform one or more of processes, examples, implementations, or examples thereof, which have been described or suggested. CPU 1102 may be adapted to access and execute such machine-readable instructions. Through execution of these machine-readable instructions, CPU 1102 may direct correlator 1118 to analyze the SPS correlation functions provided by correlator 1118, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1102 at a subscriber station may estimate a location the subscriber station based, at least in part, on signals received from SVs as illustrated above. CPU 1102 may also be adapted to determine a code search range for acquiring a second received signal based, at least in part, on a code phase detected in a first received signals as illustrated above according to particular examples.

Figure 12:
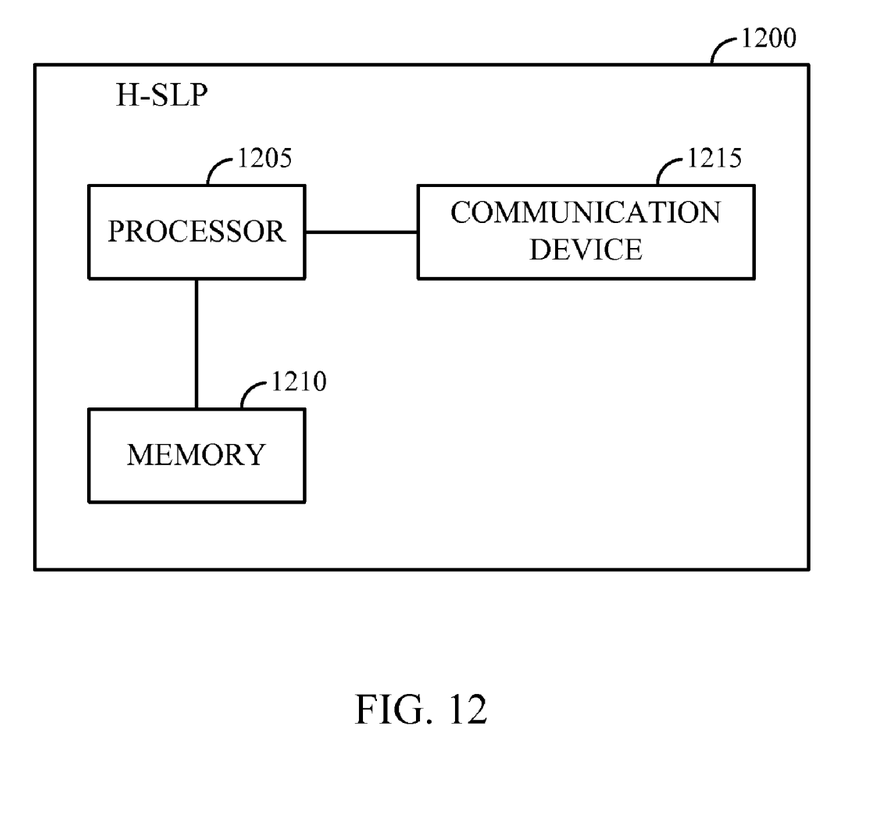
FIG. 12 shows a block diagram of an H-SLP according to one implementation.

FIG. 12 shows a block diagram of a H-SLP 1200 according to one implementation. As shown, H-SLP 1200 may include a processor 1205, a memory 1210, and a communication device 1215. The memory 1210 may store instructions, such as program code, that may be implemented by the processor 1205. The communication device 1215 may include an antenna for communicating and/or receiving wireless transmissions. The communication device 1215 may also include a modem or other device from receiving communications via a hard-wired connection to the H-SLP 1200.

The SUPL version negotiation discussed herein may be utilized in emergency situations, for example, when a SET 105 needs to be located. An H-SLP 115 or E-SLP may initiate a SUPL session by transmitting a SUPL initiation message in which both the desired and minimum SUPL versions are indicated. In the event that the SET 105 either supports the desired SUPL version or a SUPL version no lower than the minimum specified in the SUPL initiation message, the same session can be continued in the lower SUPL version supported by the SET. This process eliminates a requirement of establishing two secure IP connections and the transmission of a SUPL END message and a second SUPL initiation message when the SET 105 does not support the desired SUPL version specified in the initial SUPL initiation message.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   transmitting a secure user plane location (SUPL) initiation message, from a network entity to an SUPL entity, the SUPL initiation message comprising an intended SUPL version and a minimum SUPL version;
   receiving a message from the SUPL entity in response to the SUPL initiation message, the received message indicating whether a SUPL version between the intended SUPL version and the minimum SUPL version inclusive is supported at the SUPL entity; and
   providing a location service if the received message indicates that a SUPL version between the intended SUPL version and the minimum SUPL version inclusive is supported.

2. The method of claim 1, wherein the received message comprises a SUPL version supported by the SUPL entity.

3. The method of claim 1, wherein the received message comprises a SUPL end message when the SUPL entity does not support a SUPL version between the intended SUPL version and the minimum SUPL version inclusive.

4. The method of claim 1, wherein the intended SUPL version comprises a SUPL major version, and wherein the minimum SUPL version comprises a SUPL major version.

5. The method of claim 4, wherein the intended SUPL version further comprises a SUPL minor version.

6. The method of claim 5, wherein the intended SUPL version is expressed as M1.m1, wherein M1 comprises the SUPL major version, and wherein m1 comprises the SUPL minor version.

7. The method of claim 1, wherein the SUPL entity comprises an SUPL Enabled Terminal (SET).

8. The method of claim 1, wherein the network entity comprises an SUPL Location Platform.

9. The method of claim 8, wherein the SUPL Location Platform comprises a Home SUPL Location Platform (H-SLP) or an Emergency SUPL Location Platform (E-SLP).

10. A method, comprising:
    receiving, by a secure user plane location (SUPL) entity, an SUPL initiation message from a network entity, the SUPL initiation message comprising an intended SUPL version and a minimum SUPL version;
    transmitting a message to the network entity in response to the SUPL initiation message, the transmitted message indicating whether a SUPL version between the intended SUPL version and the minimum SUPL version inclusive is supported at the SUPL entity; and
    receiving a location service if the transmitted message indicates that a SUPL version between the intended SUPL version and the minimum SUPL version inclusive is supported.

11. The method of claim 10, wherein the transmitted message comprises a SUPL version supported by the SUPL entity.

12. The method of claim 10, wherein the transmitted message comprises a SUPL end message when the SUPL entity does not support a SUPL version between the intended SUPL version and the minimum SUPL version inclusive.

13. The method of claim 10, wherein the intended SUPL version comprises a SUPL major version, and wherein the minimum SUPL version comprises a SUPL major version.

14. The method of claim 13, wherein the intended SUPL version further comprises a SUPL minor version.

15. The method of claim 14, wherein the intended SUPL version is expressed as M1.m1, wherein M1 comprises the SUPL major version, and wherein m1 comprises the SUPL minor version.

16. The method of claim 10, wherein the SUPL entity comprises an SUPL Enabled Terminal (SET).

17. The method of claim 10, wherein the network entity comprises an SUPL Location Platform.

18. The method of claim 17, wherein the SUPL Location Platform comprises a Home SUPL Location Platform (H-SLP) or an Emergency SUPL Location Platform (E-SLP).

19. A network entity, comprising:
    a processor configured to determine a secure user plane location (SUPL) initiation message, the SUPL initiation message comprising an intended SUPL version and a minimum SUPL version;
    a transmitter configured to transmit the SUPL initiation message to a SUPL entity;
    a receiver configured to receive a message from the SUPL entity in response to the SUPL initiation message, the received message indicating whether a SUPL version between the intended SUPL version and the minimum SUPL version inclusive is supported at the SUPL entity; and
    a communication element configured to provide a location service if the received message indicates that a SUPL version between the intended SUPL version and the minimum SUPL version inclusive is supported.

20. The network entity of claim 19, wherein the received message comprises a SUPL version supported by the SUPL entity.

21. The network entity of claim 19, wherein the received message comprises a SUPL end message when the SUPL entity does not support a SUPL version between the intended SUPL version and the minimum SUPL version inclusive.

22. The network entity of claim 19, wherein the intended SUPL version comprises a SUPL major version, and wherein the minimum SUPL version comprises a SUPL major version.

23. The network entity of claim 22, wherein the intended SUPL version further comprises a SUPL minor version.

24. The network entity of claim 23, wherein the intended SUPL version is expressed as M1.m1, wherein M1 comprises the SUPL major version, and wherein m1 comprises the SUPL minor version.

25. The network entity of claim 19, wherein the SUPL entity comprises an SUPL Enabled Terminal (SET).

26. The network entity of claim 19, wherein the network entity comprises an SUPL Location Platform.

27. The network entity of claim 26, wherein the SUPL Location Platform comprises a Home SUPL Location Platform (H-SLP) or an Emergency SUPL Location Platform (E-SLP).

28. A secure user plane location (SUPL) entity, comprising:
a receiver configured to receive a SUPL initiation message from a network entity, the SUPL initiation message comprising an intended SUPL version and a minimum SUPL version;
a processor configured to determine a response message to the SUPL initiation message, the response message indicating whether a SUPL version between the intended SUPL version and the minimum SUPL version inclusive is supported at the SUPL entity; and
a transmitter configured to transmit the response message to the network entity, wherein the receiver is further configured to receive a location service if the response message indicates that a SUPL version between the intended SUPL version and the minimum SUPL version inclusive is supported.

29. The SUPL entity of claim 28, wherein the response message comprises a SUPL version supported by the SUPL entity.

30. The SUPL entity of claim 28, wherein the response message comprises a SUPL end message when the SUPL entity does not support a SUPL version between the intended SUPL version and the minimum SUPL version inclusive.

31. The SUPL entity of claim 28, wherein the intended SUPL version comprises a SUPL major version, and wherein the minimum SUPL version comprises a SUPL major version.

32. The SUPL entity of claim 31, wherein the intended SUPL version further comprises a SUPL minor version.

33. The SUPL entity of claim 32, wherein the intended SUPL version is expressed as M1.m1, wherein M1 comprises the SUPL major version, and wherein m1 comprises the SUPL minor version.

34. The SUPL entity of claim 28, wherein the SUPL entity comprises an SUPL Enabled Terminal (SET).

35. The SUPL entity of claim 28, wherein the network entity comprises an SUPL Location Platform.

36. The SUPL entity of claim 35, wherein the SUPL Location Platform comprises a Home SUPL Location Platform (H-SLP) or an Emergency SUPL Location Platform (E-SLP).

37. An apparatus, comprising:
means for transmitting a secure user plane location (SUPL) initiation message, from a network entity to an SUPL entity, the SUPL initiation message comprising an intended SUPL version and a minimum SUPL version;
means for receiving a message from the SUPL entity in response to the SUPL initiation message, the received message indicating whether a SUPL version between the intended SUPL version and the minimum SUPL version inclusive is supported at the SUPL entity; and
means for providing a location service if the received message indicates that a SUPL version between the intended SUPL version and the minimum SUPL version inclusive is supported.

38. An apparatus, comprising:
means for receiving, at a secure user plane location (SUPL) entity, an SUPL initiation message from a network entity, the SUPL initiation message comprising an intended SUPL version and a minimum SUPL version;
means for transmitting a message to the network entity in response to the SUPL initiation message, the transmitted message indicating whether a SUPL version between the intended SUPL version and the minimum SUPL version inclusive is supported at the SUPL entity; and
means for receiving a location service if the transmitted message indicates that a SUPL version between the intended SUPL version and the minimum SUPL version inclusive is supported.

39. A non-transitory computer-readable medium comprising instructions, which, when executed by a computing platform, cause the computing platform to perform operations comprising:
transmitting a secure user plane location (SUPL) initiation message, from a network entity to an SUPL entity, the SUPL initiation message comprising an intended SUPL version and a minimum SUPL version; and
receiving a message from the SUPL entity in response to the SUPL initiation message, the received message indicating whether a SUPL version between the intended SUPL version and the minimum SUPL version inclusive is supported at the SUPL entity; and
providing a location service if the received message indicates that a SUPL version between the intended SUPL version and the minimum SUPL version inclusive is supported.

40. A non-transitory computer-readable medium comprising instructions, which, when executed by a computing platform, cause the computing platform to perform operations comprising:
receiving, at a secure user plane location (SUPL) entity, an SUPL initiation message from a network entity, the SUPL initiation message comprising an intended SUPL version and a minimum SUPL version;
transmitting a message to the network entity in response to the SUPL initiation message, the transmitted message indicating whether a SUPL version between the intended SUPL version and the minimum SUPL version inclusive is supported at the SUPL entity; and
receiving a location service if the transmitted message indicates that a SUPL version between the intended SUPL version and the minimum SUPL version inclusive is supported.

* * * * *